United States Patent [19]

Clark

[11] 4,216,764
[45] Aug. 12, 1980

[54] SOLAR ENERGY COLLECTOR SYSTEM INCLUDING APPARATUS FOR BALANCING HEAT-EXCHANGE FLUID FLOW

[75] Inventor: Peter D. Clark, New Haven, Conn.
[73] Assignee: Sunworks, Inc., Guilford, Conn.
[21] Appl. No.: 942,468
[22] Filed: Sep. 14, 1978
[51] Int. Cl.² .............................................. F24J 3/02
[52] U.S. Cl. .................................. 126/448; 138/44; 285/252
[58] Field of Search ............... 126/270, 271, 448, 432, 126/442; 237/1 A; 165/174; 285/398, 397, 371, 370; 138/44–46, 40

[56] References Cited

U.S. PATENT DOCUMENTS

| 941,150 | 11/1909 | Johnson | 285/252 |
|---|---|---|---|
| 1,978,547 | 10/1934 | McWane | 138/44 |
| 2,076,465 | 4/1937 | Kirk | 138/44 |
| 2,707,868 | 5/1955 | Goodman | 165/174 X |
| 2,803,962 | 8/1957 | West | 138/44 X |
| 3,215,134 | 11/1965 | Thomason | 126/271 |
| 3,372,949 | 3/1968 | McLay | 285/370 X |
| 3,534,815 | 10/1970 | Kagi | 165/174 |
| 3,919,858 | 11/1975 | Garland et al. | 165/174 X |
| 3,934,323 | 1/1976 | Ford et al. | 126/271 X |
| 3,994,276 | 11/1976 | Pulver | 126/270 |
| 4,038,970 | 8/1977 | D'Ascoli et al. | 126/271 |
| 4,067,317 | 1/1978 | Hubbard | 165/170 X |
| 4,098,259 | 7/1978 | Barber, Jr. et al. | 126/271 X |

FOREIGN PATENT DOCUMENTS 2535581  11/1974  Fed. Rep. of Germany ........... 126/448

*Primary Examiner*—Samuel Scott
*Assistant Examiner*—Randall L. Green
*Attorney, Agent, or Firm*—DeLio and Montgomery

[57] ABSTRACT

A cup-shaped member having cylindrical sides for coupling adjacent ends of headers of solar collectors of the liquid heat-exchange type, or a header to an associated manifold. The member has a cylindrical body and an orifice in the base through which liquid flows. Several arrangements for using the member to couple the headers together or to a manifold are disclosed.

16 Claims, 13 Drawing Figures

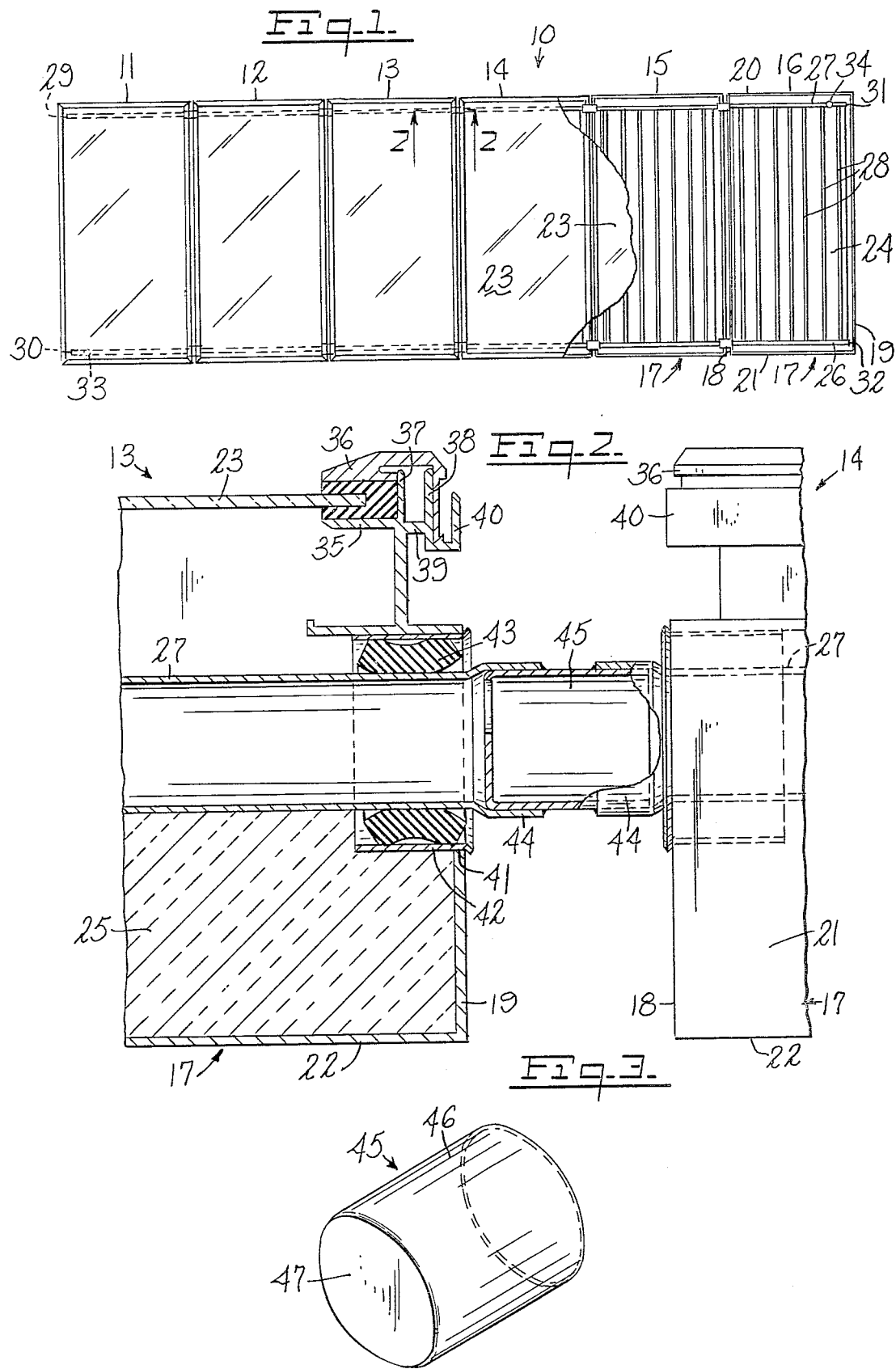

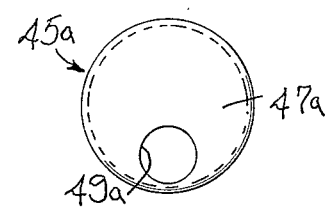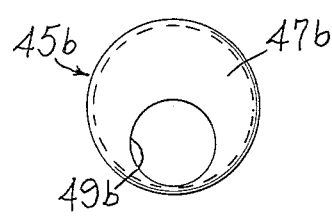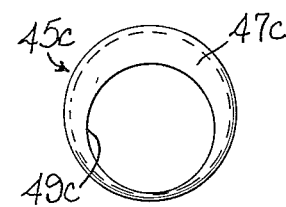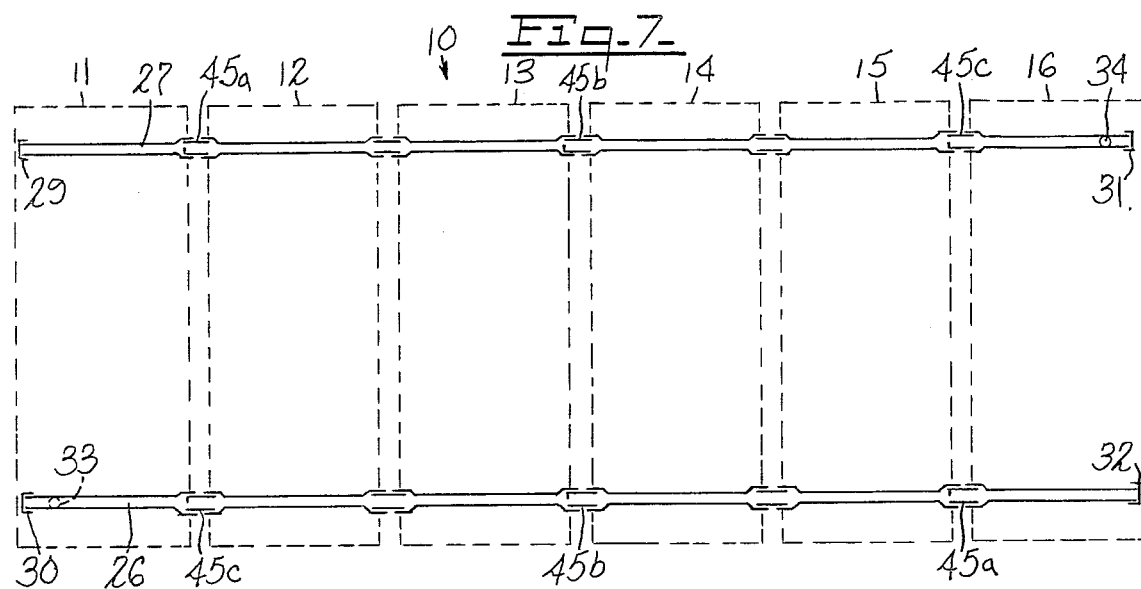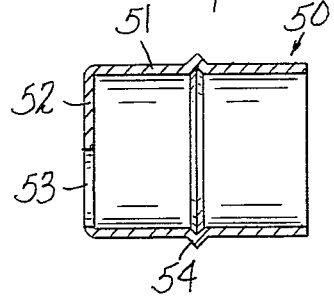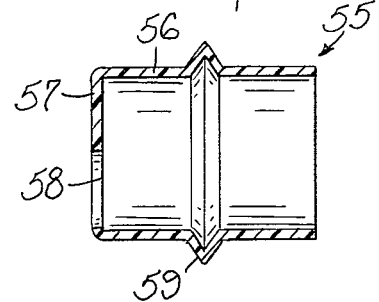

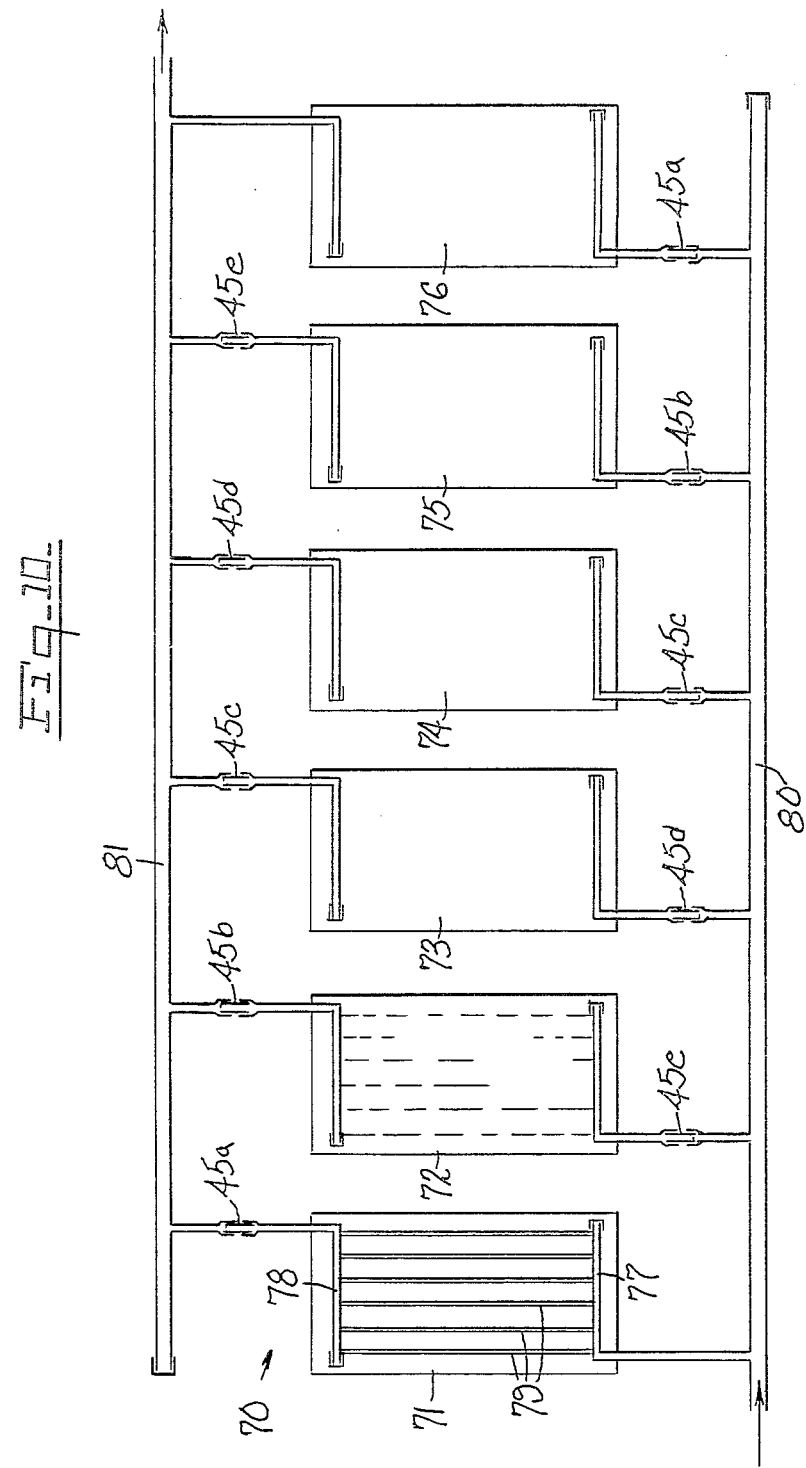

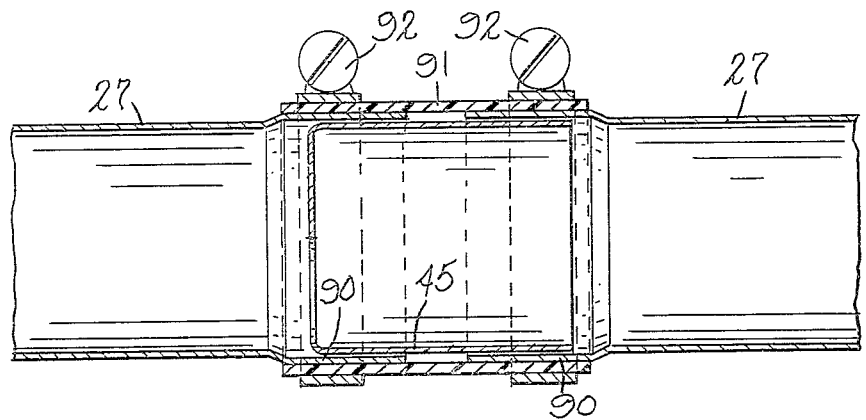
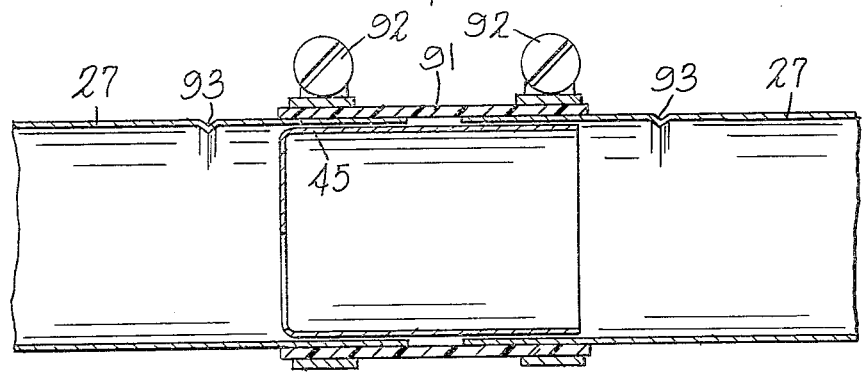
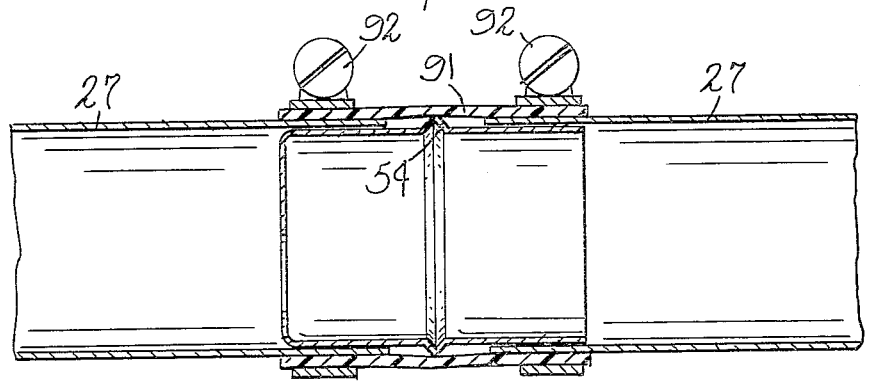

SOLAR ENERGY COLLECTOR SYSTEM INCLUDING APPARATUS FOR BALANCING HEAT-EXCHANGE FLUID FLOW

The invention relates generally to solar energy collectors of the liquid heat-exchange type.

Collectors of the liquid heat-exchange type generally comprise a housing having an absorber seated therein. A plurality of conduits are connected between upper and lower headers in intimate heat-exchange relationship with the absorber. The headers of each collector may be connected to common manifolds or other conduits or directly to the headers of adjacent collectors.

In such arrays, an uneven distribution of heat transfer fluid is generally observed with the collectors at the ends of the array having more heat transfer fluid passing therethrough than those at the center. A consequence of the uneven fluid distribution is uneven operating temperatures of the collectors. Since the efficiency of a collector is inversely related to the operating temperature and an array of collectors will normally function most efficiently when all collectors operate at the lowest possible temperature. It is desirable to provide uniform distribution of the heat transfer fluid of the collectors.

Various arrangements have been employed to achieve uniform flow distribution, including reverse return manifolding the array and providing tapered manifolds or adjustable balancing valves. The use of tapered manifolds requires either manifolding external to the collectors which is expensive or providing different sizes of manifolds with the collectors which would be expensive from a manufacturing standpoint as the size of the manifolds in each array would have to be individually determined, which would limit the use of mass production techniques. Adjustable balancing valves are expensive, and require time-consuming iterative adjustment. Such valves also require large spacing between the adjacent collectors. This reduces the percentage of collector space over the array available to collect sunlight and requires extensive set up and balancing procedures, which can take a considerable amount of time and is often not done properly by the installers.

The present invention provides a new and improved member for regulating the flow of liquid in manifolds or headers of a collector array, facilitating a shorter coupling between the headers and manifolds or the headers of adjacent collectors and reducing the time required to set up and balance the array. The member is readily adaptable to a plurality of coupling arrangements.

Briefly stated, the invention in one form provides a coupling member for use in a collector array connected in a parallel flow arrangement and disposed between headers of adjacent collectors, or between a header and manifold. The coupling member comprises a cup-shaped member at one end and having a base defining a baffle at the other end, with the base having an orifice defined therein. The size of the orifice depends on the position of the member in the array. The body has a uniform external diameter to permit it to be inserted in the collector headers.

In a second embodiment the coupling member has a circumferential fold or collar to facilitate use of the member with headers which do not have integral means for preventing the member from slipping into one of the headers and losing coupling engagement with the other header.

In a third embodiment, the coupling member is resilient and includes an accordion fold to permit the headers to expand or contract.

An object of the invention is to provide a new and improved apparatus for regulating the flow of liquid in an array of liquid heat-exchange solar energy collectors connected in a parallel flow arrangement.

Another object of the inventin is to provide a new and improved header or manifold coupling member for collectors of the type described which functions to regulate the flow of liquid to the collectors and facilitates the closer nesting of the collectors in an array.

A further object of the invention is to provide a new and improved coupling member of the type described which is inexpensively manufactured and which facilitates a reduction in the time required to set up and balance a collector array.

A further object is to provide a coupling member readily adaptable to a plurality of connecting arrangements.

The features of the invention which are believed to be novel are particularly pointed out and distinctly claimed in the concluding portion of this specificatin. The invention, however, both as to its organization and operation together with further objects and advantages thereof may best be appreciated by reference to the following detailed description taken in conjunction with the drawings, wherein:

FIG. 1 is a plan view of a six collector array, with the covers of three collectors partially cut away;

FIG. 2 is a view partially in section seen in the plane of lines 2—2 in FIG. 1;

FIG. 3 is an isometric view of a coupling member used in coupling headers of adjacent collectors together;

FIGS. 4, 5 and 6 are views of the coupling member of FIG. 3 showing progressively larger orifices in the base thereof;

FIG. 7 is a schematic diagram of the collector array of FIG. 1 showing the headers and coupling members therebetween;

FIGS. 8 and 9 are sectional views taken through the longitudinal axes of second and third embodiments of the invention, respectively;

FIG. 10 is a schematic diagram of an array of collectors between manifolds and having coupling members between the manifolds and the collectors; and FIGS. 11, 12 and 13 are side views of exemplary coupling arrangements that can be formed from additional embodiments of the invention.

An array 10 of collectors include a plurality of individual collectors. As exemplified in FIG. 1, array 10 includes six collectors 11–16. Each collector comprises a housing 17 including side walls 18 and 19, end walls 20 and 21, a base 22 and transparent cover 23. Within the housing is situated an absorber 24 resting on insulation 25. Extending inside the collectors along the lower and upper side walls of the absorber are lower and upper headers 26 and 27. A plurality of conduits 28 extend between headers 26 and 27 in intimate heat-exchange relationship with absorber 24. The headers 26 and 27 are exemplified as being connected to headers of adjacent collectors. Each header may alternatively be connected to manifolds (See FIG. 10). The ends of the headers in the extreme upstream and downstream collectors are terminated by caps 29 through 32. The lower header of the upstream collector 11 includes a liquid inlet 33 and the downstream collector 16 upper header 27 includes an outlet 34.

As exemplified in FIG. 2, each collector includes a housing shown as being of the type disclosed in U.S. Pat. No. 4,123,983. Side wall 19 includes an inwardly directed ledge 35 for supporting transparent cover member 23. The cover member is clamped between support ledge 35 and a cap 36, which is affixed to side wall 19 by means of screws extending into a trough formed by vertical members 37 and 38 and horizontal member 39. A flashing reglet 40 provides a seat for flashing (not shown) extending between adjacent collectors.

Header 27 extends through an aperture 41 in side wall 19. An adaptor member 42 is seated in aperture 41 and carries therein an annulus of sealing member 43 which surrounds header 27 to insulate it from contact with the housing frame and prevent cooler ambient air from leaking into the collector.

Headers 27 are provided with ends 44 swaged to a slightly enlarged diameter. The enlarged ends receive a coupling member 45 described more fully hereinafter. Headers 26 are also provided with enlarged ends to receive a coupling member 45.

As exemplified in FIG. 3, coupling member 45 includes a generally cup-shaped member having a cylindrical wall 46 and a integral base or end wall 47. As exemplified in FIGS. 4, 5 and 6, varying amounts of bases 47 are removed to provide orifices 49 of varying sizes. FIGS. 4, 5 and 6 exemplify three coupling members 45a, 45b and 45c, respectively, in which progressively larger amounts of the base have been removed. FIG. 4 exemplifies a coupling member 45a in which a small portion of base 47a has been removed to provide a small orifice 49a. A coupling member 45b, exemplified in FIG. 5, has a base 47b having a larger orifice 49b and a coupling member 45c exemplified in FIG. 6, has a still larger orifice 49c in base 47c. It is apparent that flow through coupling member 45a will be restricted to a greater extent than flow through coupling member 45b, and flow through coupling member 45c will be restricted least of the three.

In array 10, as schematically exemplified in FIG. 7, coupling member 45c couples headers 26 of collectors 11 and 12, coupling member 45b couples headers 26 of collectors 13 and 14, and coupling member 45a couples headers 26 of collectors 15 and 16. The inlet 33 is situated in header 26 of upstream collector 11. The base 47 of each of the coupling members may alternatively be directed upstream or downstream.

Similarly, coupling member 45a serves to couple the headers 27 of collectors 11 and 12, coupling member 45b couples headers 27 of collectors 13 and 14, and coupling member 45c couples headers 27 of collectors 15 and 16. Outlet 34 is situated in header 27 of downstream collector 16.

The orifices 49 are formed in the respective bases off-center and preferably tangential to the side-wall 46. This permits the headers to be vented of air, or drained of liquid, depending on whether the orifices are situated above center or below center. As exemplified in FIG. 7, the coupling members in headers 27 have orifices above center to facilitate venting air from those headers. The coupling members in headers 26 have orifices below center, permitting liquid to be drained from the headers.

In operation, the liquid entering headers 26 through inlet 33, encounters some increased flow resistance due to the coupling 45c in headers 26 and coupling 45a in headers 27, thus insuring a given flow in the conduits 28 of collector 11.

Couplings 45b in headers 26 present further resistance to direct flow of the liquid in both headers and thus provide a given flow in the conduits 28 in collectors 12 and 13. Coupling 45b in headers 27 has a larger orifice than coupling 45a and presents less resistance to total liquid flow in header 27. Therefore the liquid in the headers of collectors 11, 12 and 13 may flow at substantially the same rate.

Couplings 45a in headers 26 and couplng 45c in header 27 further increase the resistance to flow in both headers which insures substantially uniform flow through the conduits 28 of collector 16.

Coupling 45c in headers 27 has the largest orifice 45c of the couplings in headers 27 to offer the least resistance to the liquid entering headers 27 of collectors 11–15.

The arrangement of the coupling member 45a–45c in the array of FIG. 7 presents a system analogous to headers 26 having a decreasing cross-sectional area from collector 11 to collector 16, and headers 27 having an increaing cross-sectional area from collector 11 to collector 16. In this manner the pressure of the liquid at each conduit 28 at its junction with a header 26 is substantially constant resulting in substantially uniform liquid flow through each conduit 28. This results in higher overall efficiency of the collector array.

The coupling arrangement between the other header ends may be any conventional coupling or couplings disclosed in Application Ser. No. 883,393, filed Mar. 6, 1978. Coupling members 45 may be either soldered to the ends of the headers, or may constitute unsoldered nipples aligning the ends of the headers, with the ends of the headers being sealed with a resilient sleeve as disclosed in the referenced application.

FIG. 8 exemplifies a second embodiment of the invention suitable for use particularly with collectors having headers with ends which have not been swaged to an enlarged diameter. Generally cup-shaped coupling member 50 has cylindrical side walls 51 and a base 52 adapted to have an orifice 53 formed therein. The side walls 51 include a circumferential fold or collar 54 extending outwardly to provide spacing and prevent the member 50 from slipping too far into one of the headers to which it is coupled and lose coupling engagement with the other header.

The circumferential fold or collar shown in FIG. 8 is by way of example only; any protrusion that would prevent the member from slipping too far into one of the headers is within the scope of the invention.

A third embodiment is exemplified in FIG. 9 providing a cup-shaped coupling member 55 formed of a resilient material adapted to be connected to adjacent ends of collectors in an array. The member 55 includes cylindrical side walls 56 and a base 57 adapted to have an orifice 58 formed therein. Side walls 56 have an accordion fold 59 formed therein to allow the headers to expand and contract.

FIG. 10 schematically illustrates an array 70 of six collectors 71 through 76, each having an inlet header 77 and an outlet header 78. A plurality of heat-exchange conduits 79 extend between headers 77 and 78 in each collector. The collectors are connected between an inlet manifold 80 and an outlet manifold 81.

The inlet headers of collectors 71–76 are connected to inlet manifold 80, the headers of collectors 72 through 76 being connected through couplings 45e through 45a, respectively. The upstream collector 71 is connected directly to inlet manifold 80. Couplings 45d and 45e are similar to coupling members 45a through 45c with consecutively larger portions of base 47 being removed.

Similarily, the outlet headers of collectors 71–76 are connected to outlet manifold 81, the headers of collectors 71–75 being connected through coupling members 45a through 45e, respectively.

In operation, the effect of couplings 45a–45e between manifold 80 and headers 77 is to present a substantially uniform fluid pressure in the manifolds 80 and 81 of all of the collectors, and the couplings 45a–45e between headers 78 and manifold 81 act to balance the total flow of liquid through each of the collectors. This arrangement effectively acts as an inlet manifold of decreasing tapering cross-section from upstream toward the downstream and an outlet manifold of increasing flaring cross-section from the upstream toward the downstream.

FIGS. 11–13 exemplify alternative arrangements employing coupling member 45 to couple headers together or a header to a manifold. In FIG. 11, headers 27 have ends 90 swaged to an enlarged diameter to receive coupling member 45 in slidable engagement. A resilient tubular sleeve 91 closely envelops ends 90, secured by two hose clamps 92, one provided for each end. The coupling arrangement acommodates expansion and contraction of the headers by permitting the ends 90 to slide freely over coupling member 45 while sleeve 91 seals the connectin.

FIG. 12 exemplifies an arrangement similar to that exemplified in FIG. 11 in which the ends are not swaged. Dimples 93 are provided in the headers projecting inwardly to prevent member 45 from sliding too far into the headers.

With reference to FIG. 13, a similar coupling arrangement is disclosed in which neither the ends are enlarged nor are the headers provided with dimples. Coupling member 50 having circumferential collar 54 preventing the coupling member from sliding too far into the headers.

The arrangements of FIGS. 11–13 operate in a manner similar to the operation of the arrangement of FIG. 2.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

I claim:

1. In an array including at least two liquid-type solar collectors, each having a header, a cup-shaped member adapted to connect between the headers of the collectors to facilitate the balanced flow of liquid through the collectors, said member having a cylindrical wall and a base defining an orifice adapted to permit liquid to flow therethrough dimensioned to balance the flow of liquid passing through the collectors.

2. In an array as set forth in claim 1, the collectors each having an upper header and a lower header, the member coupling the upper headers having the orifice situated above center to permit the headers to be vented of air.

3. In an array as set forth in claim 2, the member coupling the lower headers having the orifice situated below center to permit the headers to be drained of liquid.

4. A member as set forth in claim 1 which further includes means protruding therefrom adapted to prevent the member from slipping too far into one header and losing coupling engagement with the other header.

5. A member as set forth in claim 4 in which said protruding means comprises a circumferential accordion fold.

6. A member as set forth in claim 1 in which the body of the member is resilient and includes an accordion fold to permit the headers to expand and contract.

7. A solar collector array comprising at least two solar collectors of the liquid heat-exchange type each having inlet headers and outlet headers, the inlet headers being interconnected and the outlet headers being interconnected, and at least one coupling member coupling a header of one collector to a header of another collector to facilitate the balanced flow of liquid through the collectors, said coupling member comprising a hollow cup-shaped member having a cylindrical side wall and a base slidably received in adjacent headers, an orifice defined in the base of said member dimensioned to balance the flow of liquid through the collectors.

8. An array as set forth in claim 7 in which the coupling members couple between the headers of every pair of collectors in the array.

9. An array as set forth in claim 7 in which said headers have ends having an enlarged diameter, said coupling member engaging said ends, said array further including a resilient sleeve sealing said ends, said sleeve being clamped to each end.

10. An array as set forth in claim 7 in which said headers each have means preventing said member from slipping too far into either of said headers and lose engagement with the other header, said array further including a resilient sleeve sealing said ends.

11. An array as set forth in claim 10 in which said slipping preventing means comprises an inwardly projecting dimple preventing said member from slipping too far into either of said headers and lose engagement with the other header, said array further including a resilient sleeve sealing said ends.

12. A solar collector array comprising at least two solar collectors of the liquid heat-exchange type, each collector having headers connected to manifolds, and coupling members each adapted to couple a header to its associated manifold to facilitate the balanced flow of liquid through the collectors, each of said coupling members comprising a hollow cup-shaped member having a cylindrical side wall and a base slidably received in a header and an associated manifold, an orifice adapted to permit liquid to flow therethrough defined in said base and dimensioned to balance the flow of liquid passing through the collectors.

13. An array as defined in claim 12 wherein the inlet header of the upstream-most collector, and the outlet header of the downstream-most collector, are both connected directly to the associated manifold.

14. An array as set forth in claim 12 in which each header and each associated manifold have an enlarged portion, said coupling member engaging said respective enlarged portions, said array further including a resilient sleeve sealing said enlarged portions.

15. An array as set forth in claim 12 in which each header and associated manifold have a dimple preventing said member from slipping too far into either of said headers or associated manifold and lose engagement with the other, said array further including a resilient sleeve sealing said header and associated manifold connection.

16. An array as defined in claim 12 in which said member has an outwardly projecting dimple to prevent said member from slipping too far into either of the headers or the associated manifold, and further including a resilient sleeve sealing said header and associated manifold connection.

* * * * *

UNITED STATES PATENT AND TRADEMARK OFFICE
CERTIFICATE OF CORRECTION

PATENT NO. : 4,216,764
DATED : August 12, 1980
INVENTOR(S) : Peter D. Clark

It is certified that error appears in the above–identified patent and that said Letters Patent are hereby corrected as shown below:

Column 3, Line 6, please correct referenced U. S. Patent No. as follows:

"4,123,[9]83" should read --4,123,883--.

Signed and Sealed this

*Eleventh* Day of *November 1980*

[SEAL]

*Attest:*

SIDNEY A. DIAMOND

*Attesting Officer*     *Commissioner of Patents and Trademarks*